(12) United States Patent
Schmitt et al.

(10) Patent No.: US 6,554,376 B2
(45) Date of Patent: Apr. 29, 2003

(54) METHOD AND DEVICE FOR ADJUSTING THE BRAKING AND/OR DRIVING EFFECT ON THE WHEELS OF A MOTOR VEHICLE

(75) Inventors: Johannes Schmitt, Markgroeningen (DE); Klaus-Peter Mattern, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,007

(22) PCT Filed: Dec. 6, 2000

(86) PCT No.: PCT/DE00/04342

§ 371 (c)(1),
(2), (4) Date: Jan. 25, 2002

(87) PCT Pub. No.: WO01/42070

PCT Pub. Date: Jun. 14, 2001

(65) Prior Publication Data

US 2002/0163246 A1 Nov. 7, 2002

(30) Foreign Application Priority Data

Dec. 8, 1999 (DE) .......................................... 199 59 039

(51) Int. Cl.[7] ................................................. B60T 8/88

(52) U.S. Cl. ............... 303/191; 303/122.03; 303/122.05
(58) Field of Search ................................. 303/139, 182, 303/191, 122.03, 122.05

(56) References Cited

U.S. PATENT DOCUMENTS

| 4,648,662 | A | * | 3/1987 | Fennel et al. .................. 303/92 |
| 5,060,747 | A | * | 10/1991 | Eto .............................. 180/197 |
| 5,277,482 | A | * | 1/1994 | Beyer et al. .................. 303/92 |
| 5,579,235 | A | * | 11/1996 | Schlichenmaier et al. .. 364/483 |
| 5,852,788 | A | * | 12/1998 | Toyoda et al. ................ 701/74 |
| 6,126,250 | A | * | 10/2000 | Gutoehrlein et al. ... 303/122.03 |

FOREIGN PATENT DOCUMENTS

| DE | 34 17 019 | 11/1985 |
| EP | 0 449 845 | 10/1991 |
| EP | 0 635 135 | 1/1995 |
| EP | 0 814 983 | 1/1998 |

\* cited by examiner

*Primary Examiner*—Christopher P. Schwartz
(74) *Attorney, Agent, or Firm*—Kenyon & Kenyon

(57) ABSTRACT

By allowing for the possibility that light-weight spare wheels or spare wheels are mounted, a demonstration of the possible ways for replacing the output signals of one or more defective wheel speed sensors is presented.

11 Claims, 5 Drawing Sheets

METHOD AND DEVICE FOR ADJUSTING THE BRAKING AND/OR DRIVING EFFECT ON THE WHEELS OF A MOTOR VEHICLE

FIELD OF THE INVENTION

The present invention relates to methods and devices for adjusting the braking and/or driving effect at the wheels of a motor vehicle.

BACKGROUND INFORMATION

Such systems are known, for example, as anti-skid systems, traction control systems or vehicle stability systems. These systems have in common the fact that the adjustment of the braking and/or driving effect at the motor vehicle wheels is at least dependent on the detected wheel speeds. These wheel speeds are generally detected by wheel speed sensors. In this connection, emergency measures must be provided for the event that one or more wheel speed sensors are defective. German Published Patent Application No. 34 17 019 describes a circuit arrangement for a traction-controlled vehicle-braking system, the braking pressure control at the wheel having the defective sensor being dependent on the rotational characteristics of the front wheel on the same side in the event of a failure or a malfunction of a rear wheel speed sensor. From European Patent No. 0 814 983, it is known that in the event of a failure of a rear wheel speed sensor signal, the vehicle speed reference signal or the vehicle speed signal itself is used as a substitute signal for the defective speed signal.

If there is tire damage on a motor vehicle, often only a light-weight spare wheel or spare wheel is provided. In contrast to the standard wheels, such a light-weight spare wheel or spare wheel has a significantly smaller diameter. The detection of such light-weight spare wheels or spare wheels is known from European Patent No. 0 449 845.

A mulitplicity of measures is known for checking the function of speed sensors or for the error recognition of speed sensors. As an example, reference should be made to European

SUMMARY OF THE INVENTION

The present invention relates to methods and devices for adjusting the braking and/or driving effect at the wheels of a motor vehicle having at least four wheels mounted on at least two axles. Sensors are assigned to these wheels which detect the rotational movements of the wheels. The adjustment of the braking and/or driving effect is activated at least as a function of the output signals of these sensors. Moreover, it is determined according to the present invention whether a spare wheel, i.e., a wheel having a smaller diameter than the other wheels, is mounted. In addition, defects in the sensors are determined. In response to the detection of a defect in one sensor, in accordance with the present invention, the adjustment of the braking and/or driving effect at the wheel of an axle assigned to this sensor is activated as a substitute as a function of the detected rotational movement at the wheel of another axle on the same side.

According to the present invention, the substitution by the wheel speed sensor on the same side is only activated if it is determined that this wheel on the same side is not a spare wheel. Taking the possible mounting of a spare wheel into account increases the quality of the substitution measure. If the wheel on the same side were namely a spare wheel, the substitute signal for the failed sensor would represent an incorrect rotational movement at the wheel at which the sensor had failed.

According to the present invention, the sensor signal at the wheel of the other axle on the same side is only used as a substitute when it is determined that such wheel is not a spare wheel. If, however, a spare wheel is mounted to the other axle on the same side as the failed sensor, then according to an advantageous embodiment of the present invention, the output signal of the sensor on the other wheel of the same axle is used as a substitute signal. In response to the determination of a defect in one sensor, the adjustment of the braking and/or driving effect at the wheel of an axle assigned to this sensor is then activated as a substitute as a function of the detected rotational movement at the other wheel of the same axle if it is determined that the wheel of another axle on the same side is a spare wheel. In this manner an effective emergency measure is obtained even if a spare wheel is mounted to the wheel of the same side.

A further embodiment of the present invention assumes that at least one wheel is driven by a drive unit via the drive train of the motor vehicle. In this connection, a rotation quantity is detected which represents a rotational movement in the drive train. This rotation quantity may, for example, represent the output speed of the drive unit, in general of the vehicle engine and/or the input and/or the output speed of a transmission arranged in the drive train. According to of this embodiment, in response to the determination of a defect in at least two sensors, the adjustment of the braking and/or driving effect at the wheels assigned to these sensors is activated as a substitute as a function of the detected rotation quantity. According to this embodiment, the case in which two speed sensors are defective is advantageously taken into account. In this case, a rotation quantity in the drive train is used as a substitute quantity. With this substitution by the rotation quantity, it is possible to take into account a corresponding gear ratio acting-in the drive train and/or the efficiency of the drive train and/or a slip of a clutch arranged in the drive train and/or the operating state of a torque converter arranged in the drive train.

In a further modification of the present invention, an acceleration quantity representing the vehicle's longitudinal acceleration is detected. In this case also, defects in the speed sensors are determined. According to this modification of the present invention is that in response to the determination of a defect in one sensor, the adjustment of the braking and/or driving effect at the wheel of an axle assigned to this sensor is activated as a substitute as a function of the detected acceleration quantity. In this connection, it is provided in particular that the acceleration quantity is integrated and the integrated acceleration quantity is used as a substitute. A suitable substitute quantity for wheel rotational movement is obtained in this manner via the longitudinal acceleration. In this embodiment of the present invention, it can be provided that the acceleration quantity and/or the integrated acceleration quantity is corrected as a function of the angle of inclination of the vehicle in longitudinal direction.

In a third modification of the present invention, a rotation quantity is also detected which represents a rotational movement in the drive train. Furthermore, defects in the sensors are also determined in this case. According to this modification, in response to the determination of a defect in one sensor, the adjustment of the braking and/or driving effect at the wheels assigned to these sensors is activated as a substitute as a function of the detected rotation quantity.

DETAILED DESCRIPTION

Various embodiments of the present invention are describe below with reference to exemplary embodiments.

Figure 1:
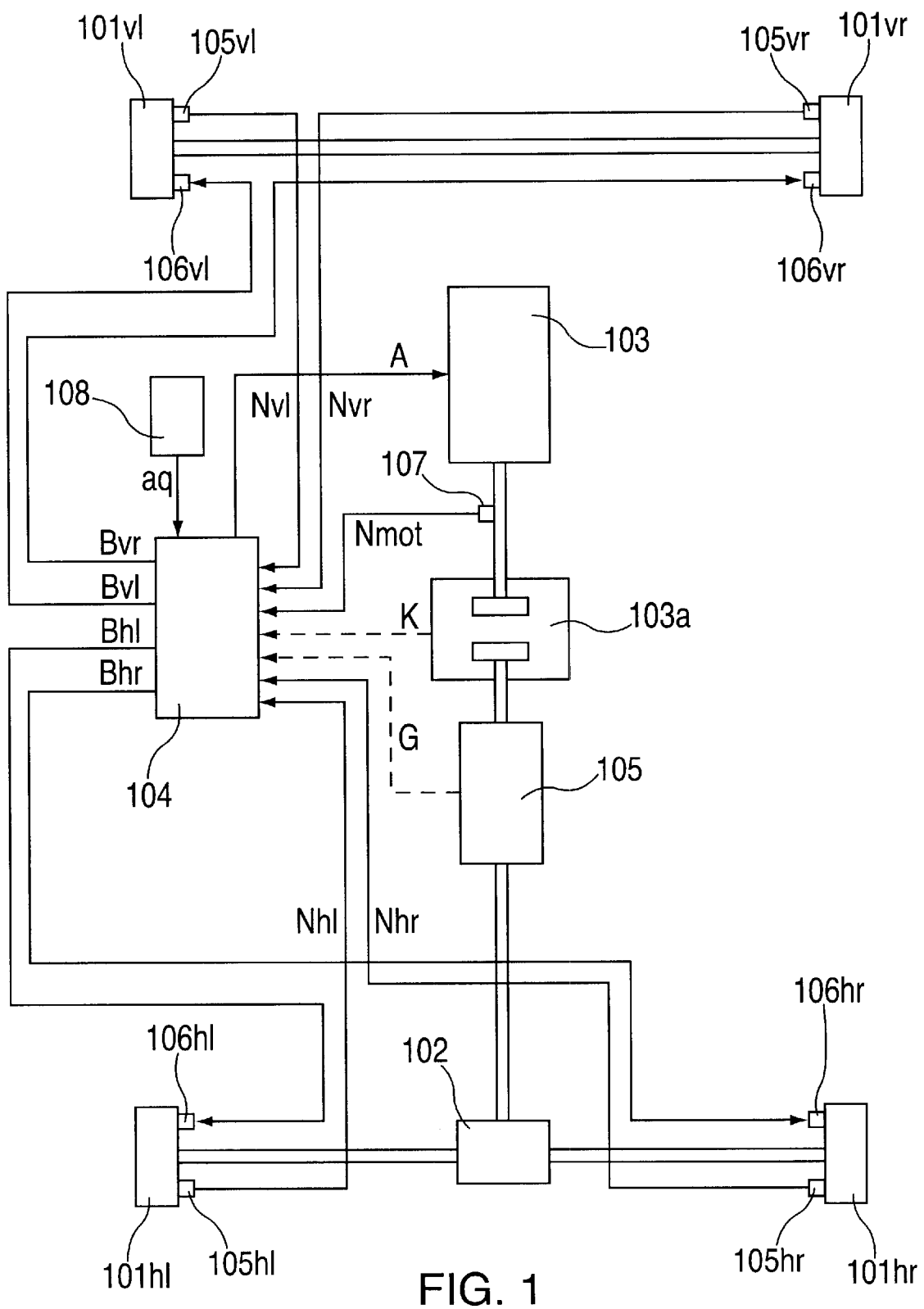
FIG. 1 shows a block diagram of the present invention.

FIG. 1 shows a schematic view of a vehicle with vehicle wheels 101$ij$. In the following, the index i identifies the association of the corresponding quantity with the rear (i=h) or the front (i=v) vehicle axle. The index j indicates the association of the corresponding quantity with the right (j=r) or the left (j=l) side of the vehicle. Speed sensors 105$ij$ and wheel brake units 106$ij$ are mounted on vehicle wheels 101$ij$. Wheel speed sensors 105$ij$ send their output signals Nij to control unit 104. In control unit 104, triggering signals Bij for wheel brake units 106$ij$ are formed at least as a function of wheel speed values Nij. This takes place in a generally known manner, for example, by forming slip values for individual vehicle wheels 101$ij$ from wheel speeds Nij, the braking effect at the individual vehicle wheels being adjusted via signals Bij in such a way that a specific brake slip or drive slip is not exceeded.

In addition, the vehicle's drive train is sketched in FIG. 1. The vehicle's engine is labeled with reference symbol 103, the output power or output torque or output speeds of which can be made subject to open or closed loop control by control unit 104 via triggering signal A. Output speed Nmot of engine 103 is detected by speed sensor 107 and sent to control unit 104.

Vehicle engine 103 is connected to transmission 105 via clutch 103$a$. The instantaneous operating state of the clutch, in particular the clutch slip, is supplied to control unit 104 via signal K. Likewise, the instantaneous gear ratio of transmission 105 is supplied to control unit 104 with signal G. Transmission 105 is in turn connected to the drive wheels on the rear axle via differential 102.

Reference symbol 108 identifies an acceleration sensor which detects the vehicle's longitudinal acceleration and sends a corresponding acceleration signal al to control unit 104.

Figure 2:
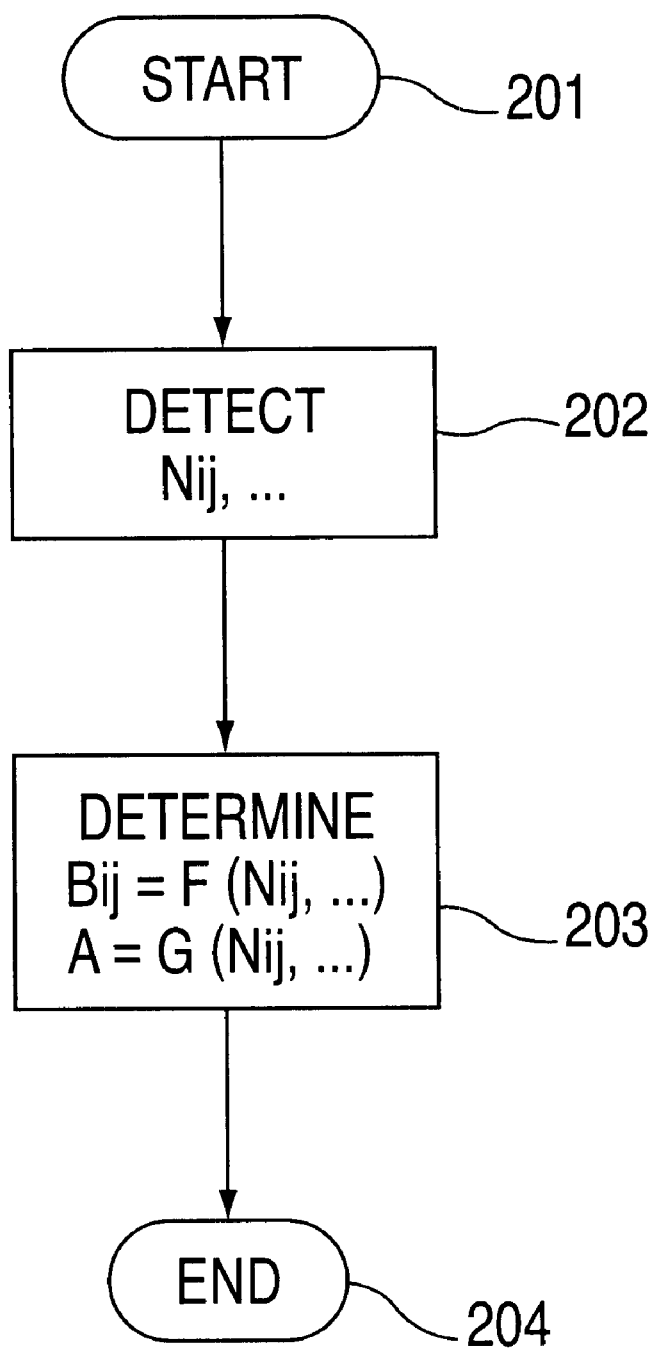
FIG. 2 shows a flow chart of one embodiment of the present invention.

The adjustment of the braking and/or driving effect at vehicle wheels 101$ij$ via control unit 104 is shown schematically in FIG. 2. After starting step 201, wheel speed signals Nij and additional signals are detected in the following step 202. In step 203, the triggering signals for the wheel brakes 106$ij$ (triggering signal Bij) and triggering signal A for vehicle engine 103 are formed at least as a function of detected wheel speed signals Nij. This is suggested in step 203 by the functional dependence F and G. After terminal step 204, the sequence shown in FIG. 2 is restarted.

The formation of triggering signals Bij and A is described frequently in the related art and will not be explained in greater detail here.

Figure 3:
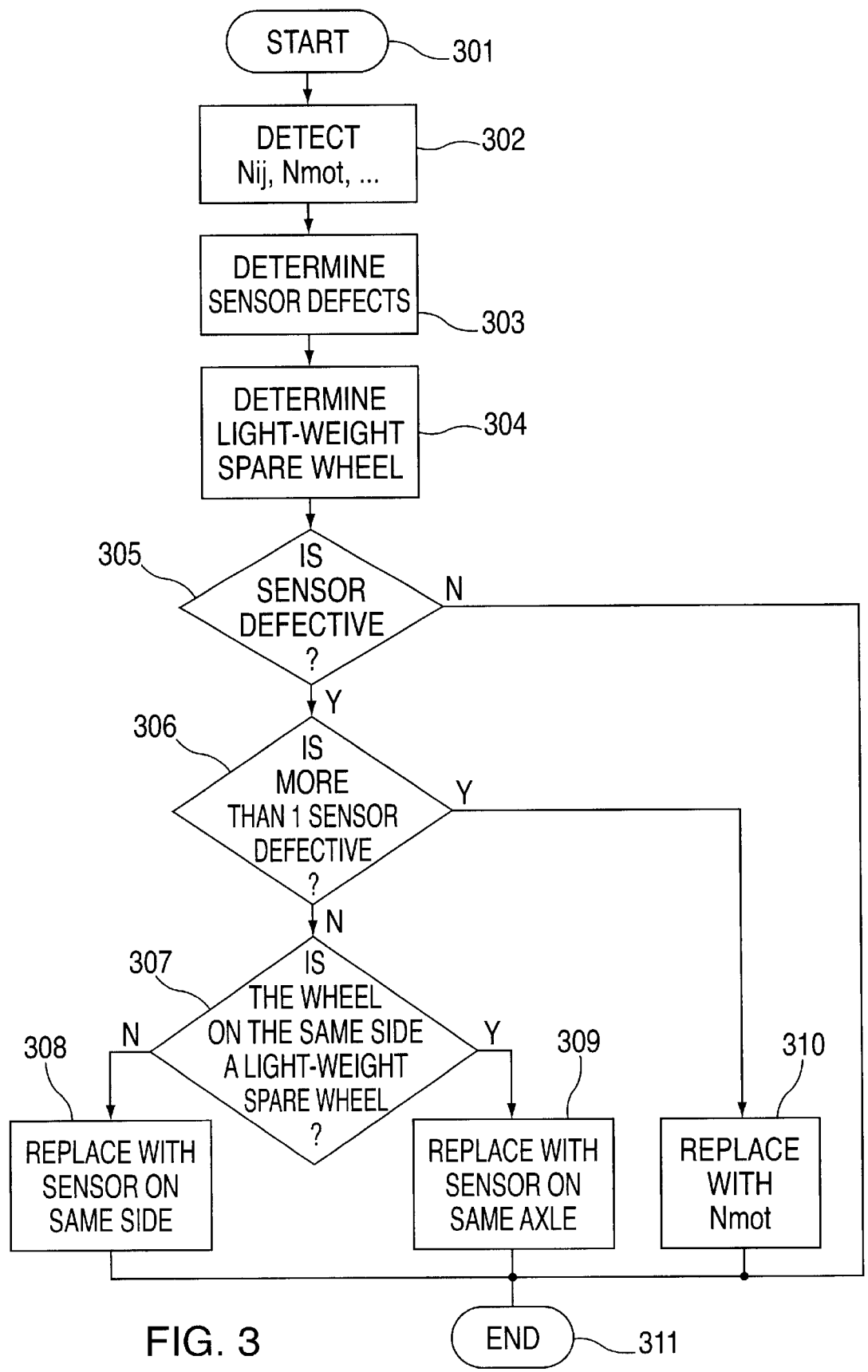
FIG. 3 shows a flow chart of another embodiment of the present invention.

A first embodiment of the present invention is shown in FIG. 3. After starting step 301, wheel speeds Nij, engine speed Nmot and other quantities are detected in step 302. Defects in wheel speed sensors 105$ij$ are determined in step 303. This determination can be found frequently in the related art and will not be described in greater detail here. For example, individual wheel speed values Nij can be checked for implausible values.

In step 304 it is determined whether a spare wheel or light-weight spare wheel is mounted at one of the vehicle wheels. This determination can also be found in the related art. For example, the individual wheel speed values are compared with the vehicle speed for this purpose. If one of the wheels has an elevated speed value for an extended period of time, it can be concluded that this wheel is a spare wheel or light-weight spare wheel.

In query 305, the result of step 303 is queried. If no sensor is defective, the program skips directly to terminal step 311. If, however, it is determined in step 305 that a sensor is defective, a query is made in step 306 to determine whether more than one sensor has a defect. If this is not the case, i.e., only one individual sensor is defective, a query is made in step 307 to determine whether a light-weight spare wheel is mounted on the other axle on the same side of the vehicle as the defective senor. If the wheel on the same side is not a light-weight spare wheel, the wheel speed of the defective sensor is replaced by the output signal of the sensor on the same side in step 308.

If, however, it is determined in step 307 that the wheel on the same side is a light-weight spare wheel or spare wheel, the output signal of the defective sensor is replaced by the output signal of the sensor on the same axle in step 309.

However, if query 306 shows that more than one sensor is defective, the output signals of the defective sensors in step 310 are replaced by a correspondingly processed engine speed Nmot. In processing the engine speed, the overall gear ratio Iges of the drive train as well as the efficiency al of the drive train is taken into account. This embodiment relates to a vehicle with rear wheel drive. Overall gear ratio Iges between vehicle engine 103 and rear wheels 101$hl$ and 101$hr$ is thus determined by gear ratio Igang of transmission 105 (signal G in FIG. 1), by gear ratio Idiff of differential 102 and by efficiency $\eta$:

$$I\text{ges} = I\text{gang} * I\text{diff} * \eta$$

Conversely, overall gear ratio Iges $$\left[ \frac{1/\min}{\text{km/h}} \right]$$

is $$I\text{ges} = \frac{Nmot}{(Nhl + Nhr) * 0.5}$$

From this it follows in the event that a speed sensor on side j=x has failed:

a) In the event that the clutch is closed:

$$Nhx = \frac{Nmot}{I\text{ges} * 0.5} - Nhy$$

b) In the event that clutch 103$a$ is open:

$$Nhx = Nhy$$

Speed fluctuations arising as a result of a transition between cases a) and b) are eliminated by appropriate time filtering.

c) In the event of a slipping clutch or if there is a torque converter, the clutch slip or converter slip, respectively, is taken into account in step 310 (signal K in FIG. 1).

Figure 4:
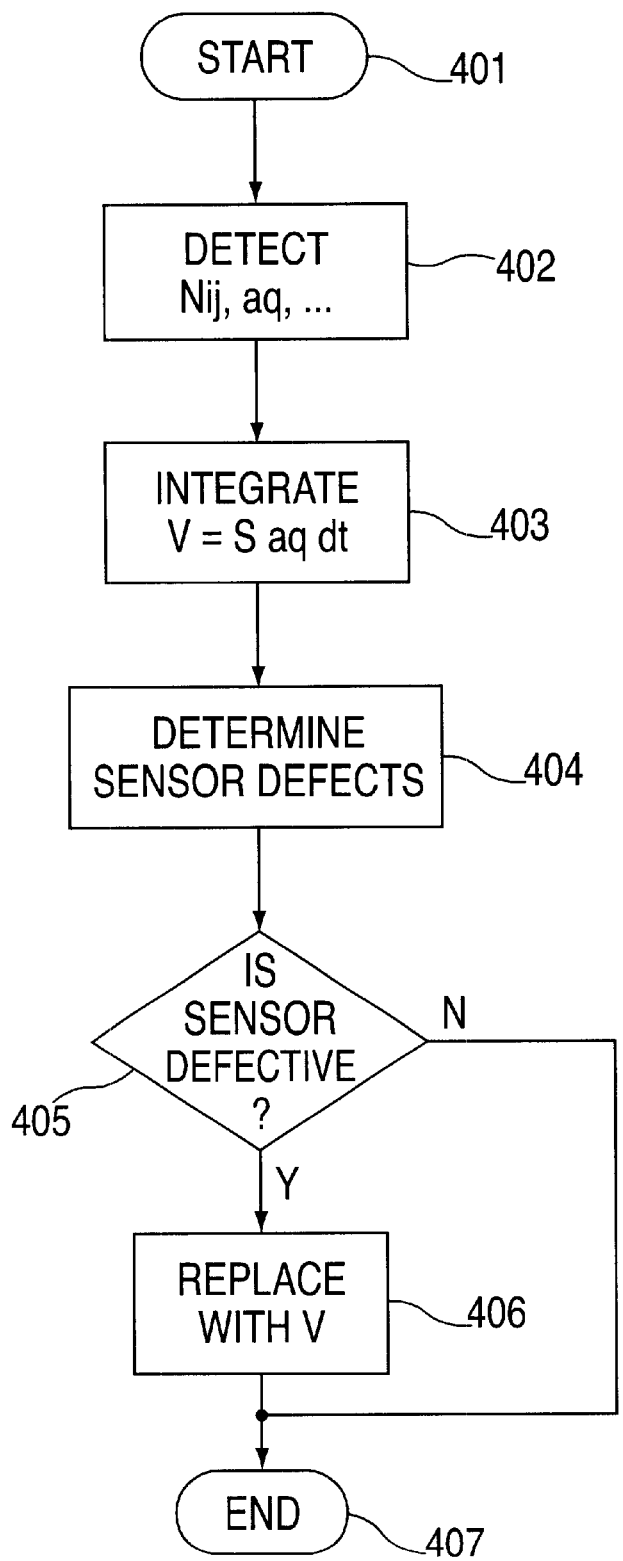
FIG. 4 shows a flow chart of another embodiment of the present invention.

A second embodiment of the present invention is shown in FIG. 4 based on an exemplary embodiment. After starting step 401, wheel speeds Nij as well as output signal a1 of longitudinal acceleration sensor 108 are detected in step 402. In following step 403, the vehicle's longitudinal acceleration a1 is integrated with the vehicle's longitudinal speed V.

$$V = \int a1 * dt$$

Moreover, it may be provided that longitudinal acceleration a1 and/or the vehicle's longitudinal speed V thus determined is corrected as a function of the angle of inclination of the vehicle in the longitudinal direction (uphill/downhill driving).

Sensor defects are determined in step 404, whereupon a query is made in step 405 as to whether a sensor is defective. If no sensor is defective, the program skips immediately to terminal step 407. If, however, a sensor is defective, the output signal of the defective sensor is replaced by the vehicle's longitudinal speed V determined from the vehicle's longitudinal acceleration.

Figure 5:
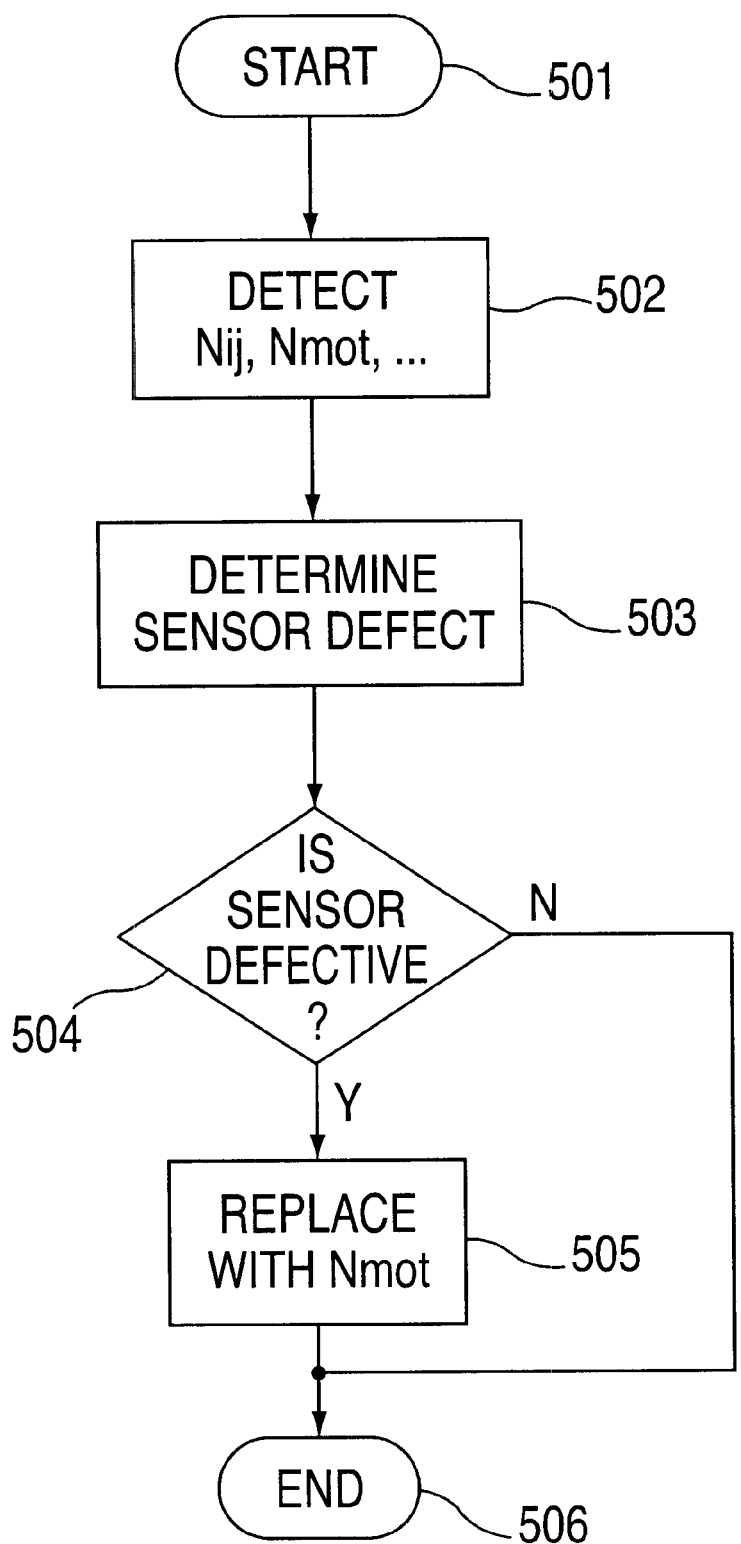
FIG. 5 shows a flow chart of another embodiment of the present invention.

A further embodiment of the present invention is shown, for example, in FIG. 5. In this case also, wheel speeds Nij and engine speed Nmot are detected in step 502 after starting step 501. In step 503, sensor defects are again determined and a query is made in step 504 as to whether a sensor is defective. If no sensor is defective, the program skips to terminal step 506. If, however, it is determined in step 504 that a sensor is defective, the output signal of the defective sensor is replaced by correspondingly processed engine speed Nmot. Reference should be made to the description of block 310 (FIG. 3) for the processing of the engine speed.

Instead of engine speed Nmot, a transmission input speed or a transmission-output speed may obviously also be used in step 310 and 505, respectively.

The sequences shown in FIGS. 2, 3, 4 and 5 are restarted with the starting steps after the terminal steps.

Thus the present invention provides various possibilities for a backup level for an anti-skid system, a traction control system, an electronic braking force distribution system or other control systems in the event of a speed sensor failure. The formation of the substitute measures according to the present invention in the event of a speed failure makes it possible to complete the continuous closed loop control with a plausibilized wheel speed or to configure the control with reduced control quality so that shorter braking distances and more stabile vehicle handling characteristics are achieved.

What is claimed is:

1. A method for adjusting at least one of a braking and a driving effect at wheels of a motor vehicle, the wheels including at least four wheels mounted on at least two axles, the motor vehicle including sensors assigned to the wheels for detecting rotational movements of the wheels, the method comprising the steps of:

determining whether a spare wheel is mounted, the spare wheel having a smaller diameter than others of the wheels;

determining a defect in at least one of the sensors;

adjusting the at least one of the braking and the driving effect at least as a function of output signals of the sensors; and in response to determining the defect in one of the sensors, adjusting at least one of the braking and the driving effect at the wheel of an axle assigned to the one of the sensors as a function of the detected rotational movement at the wheel of another axle on the same side if the wheel on the same side is not determined to be the spare wheel.

2. The method according to claim 1, further comprising the steps of:

causing a drive unit to drive at least one of the wheels via a drive train of the motor vehicle;

detecting a rotation quantity that represents a rotational movement in the drive train; and in response to determining the defect in at least two of the sensors, adjusting the at least one of the braking and the driving effect at the wheels assigned to the at least two of the sensors as a function of the detected rotation quantity.

3. The method according to claim 2, wherein:

the detected rotation quantity represents at least one of an output speed of the drive unit, an input speed of a transmission arranged in the drive train, and an output speed of the transmission.

4. The method according to claim 1, further comprising the step of:

in response to determining the defect in the one of the sensors, adjusting the at least one of the braking and the driving effect at the wheel of the axle assigned to the one of the sensors as a function of the detected rotational movement at the other wheel of the same axle if the wheel of the other axle on the same side is determined to be the spare wheel.

5. The method according to claim 2, further comprising the step of:

in response to determining the defect in the at least two of the sensors, adjusting the at least one of the braking and the driving effect at the wheels assigned to the at least two of the sensors as a function of the detected rotation quantity, wherein:

at least one of a corresponding gear ratio acting in the drive train, an efficiency of the drive train, a slip of a clutch arranged in the drive train, and an operating state of a torque converter arranged in the drive train are taken into account.

6. A method for adjusting at least one of a braking and a driving effect at wheels of a motor vehicle, the wheels including at least four wheels mounted on at least two axles, the motor vehicle including sensors assigned to the wheels for detecting rotational movements of the wheels, the method comprising the steps of:

detecting an acceleration quantity representing a longitudinal acceleration of the motor vehicle;

determining a defect in at least one of the sensors;

adjusting the at least one of the braking and the driving effect at least as a function of output signals of the sensors;

in response to determining the defect in one of the sensors, adjusting the at least one of the braking and the driving effect at the wheel of an axle assigned to the one of the sensors as a function of the detected acceleration quantity, the detected acceleration quantity being integrated into an integrated acceleration quantity used as the substitute; and correcting at least one of the detected acceleration quantity and the integrated acceleration quantity as a function of an angle of inclination of the motor vehicle.

7. A method for adjusting at least one of a braking and a driving effect at wheels of a motor vehicle, the wheels including at least four wheels mounted on at least two axles, the motor vehicle including sensors assigned to the wheels for detecting rotational movements of the wheels, the method comprising the steps of:

causing a drive unit to drive at least one of the wheels via a drive train of the motor vehicle;

detecting a rotational quantity that represents a rotational movement in the drive train;

determining a defect in at least one of.the sensors;

adjusting the at least one of the braking and the driving effect at least as a function of output signals of the sensors; and in response to determining the defect in one of the sensors, adjusting the at least one of the braking and the driving effect at the wheel assigned to the one of the sensors as a function of the detected rotational quantity.

8. A device for adjusting at least one of a braking and a driving effect at wheels of a motor vehicle, the wheels including at least four wheels mounted on at least two axles, the motor vehicle including sensors assigned to the wheels for detecting rotational movements of the wheels, the device comprising:

an arrangement for determining whether a spare wheel is mounted, the spare wheel having a smaller diameter than others of the wheels;

an arrangement for determining a defect in at least one of the sensors;

an arrangement for adjusting the at least one of the braking and the driving effect at least as a function of output signals of the sensors; and an arrangement for, in response to determining the defect in one of the sensors, adjusting the at least one of the braking and the driving effect at the wheel of an axle assigned to the one of the sensors as a function of the detected rotational movement at the wheel of another axle on the same side if the wheel on the same side is not determined to be the spare wheel.

9. The device according to claim 8, further comprising:

an arrangement for, in response to determining the defect in the one of the sensors, adjusting of the at least one of the braking and the driving effect at the wheel of the axle assigned to the one of the sensors as a function of the detected rotational movement at the other wheel of the same axle if the wheel of the other axle on the same side is determined to be the spare wheel.

10. The device according to claim 8, comprising:

an arrangement for causing a drive unit to drive at least one of the wheels via a drive train of the motor vehicle;

an arrangement for detecting a rotation quantity that represents a rotational movement in the drive train; and an arrangement for, in response to determining the defect in at least two of the sensors, adjusting the at least one of the braking and the driving effect at the wheels assigned to the at least two of the sensors as a substitute as a function of the detected rotation quantity.

11. A device for adjusting at least one of a braking and a driving effect at wheels of a motor vehicle, the wheels including at least four wheels mounted on at least two axles, the motor vehicle including sensors assigned to the wheels for detecting rotational movements of the wheels, the device comprising:

an arrangement for detecting an acceleration quantity representing a longitudinal acceleration of the motor vehicle;

an arrangement for determining a defect in at least one of the sensors;

an arrangement for adjusting the at least one of the braking and the driving effect at least as a function of output signals of the sensors;

an arrangement for, in response to determining the defect in one of the sensors, adjusting the at least one of the braking and the driving effect at the wheel of an axle assigned to the one of the sensors as a function of the detected acceleration quantity, the detected acceleration quantity being integrated into an integrated acceleration quantity used as the substitute; and an arrangement for correcting at least one of the detected acceleration quantity and the integrated acceleration quantity as a function of an angle of inclination of the motor vehicle.

* * * * *

UNITED STATES PATENT AND TRADEMARK OFFICE
CERTIFICATE OF CORRECTION

PATENT NO. : 6,554,376 B2
DATED : April 29, 2003
INVENTOR(S) : Johannes Schmitt et al.

It is certified that error appears in the above-identified patent and that said Letters Patent is hereby corrected as shown below:

Column 1,
Line 41, change "European" to -- European Patent No. 0635-135. --.

Column 8,
Line 42, insert -- 12. A device for adjusting at least one of a braking and a driving effect at wheels of a motor vehicle, the wheels including at least four wheels mounted on at least two axles, the motor vehicle including sensors assigned to the wheels for detecting rotational movement of the wheels, the device comprising:
    an arrangement for causing a drive unit to drive at least one of the wheels via a drive train of the motor vehicle;
    an arrangement for detecting a rotating quantity that represent a rotational movement in the drive train;
    an arrangement for determining a defect in at least one of the sensors;
    an arrangement for adjusting the at least one of the braking and the driving effect at least as a function of output signals of the sensors; and
    an arrangement for, in response to determining the defect in one of the sensors, adjusting the at least one of the braking and the driving effect at the wheel assigned to the one of the sensors as a function of the detected rotational quantity. --

Signed and Sealed this

Twenty-second Day of June, 2004

JON W. DUDAS
*Acting Director of the United States Patent and Trademark Office*